Oct. 2, 1923.

H. J. HICK

BATTERY CLAMP

Filed Oct. 8, 1921

1,469,595

Inventor
Harry J. Hick
By Frease and Bond
Attorneys

Patented Oct. 2, 1923.

1,469,595

UNITED STATES PATENT OFFICE.

HARRY J. HICK, OF ALLIANCE, OHIO, ASSIGNOR TO THE HYKON MANUFACTURING COMPANY, OF ALLIANCE, OHIO, A CORPORATION OF OHIO.

BATTERY CLAMP.

Application filed October 8, 1921. Serial No. 506,309.

*To all whom it may concern:*

Be it known that I, HARRY J. HICK, a citizen of the United States, residing at Alliance, in the county of Stark and State of Ohio, have invented the new and useful Improvements in Battery Clamps, of which the following is a specification.

The invention relates to a clamp for securing battery boxes and the like in a supporting frame, and the object of the improvement is to provide a spring clamp which will not be loosened by the vibrations to which an automobile or the like is subjected.

A rigid or unyielding clamp secured by a bolt is subjected to the tendency of the battery box to move upon its support, and the nut of the bolt is frequently loosened, following which the clamp becomes detached and ultimately lost.

The present invention involves the use of a clamp made of heavy spring wire bent U-shape to form parallel side arms having hooks on their ends for engaging the handle of the battery box while the other end bears upon an adjacent flange of the support.

The clamp is secured in position by means of a transverse spring metal washer plate having its ends curved over the side arms of the clamp, and a bolt extending through the support and the washer plate acting to deflect the arms of the clamp and also to deflect the washer plate between the sides of the clamp for locking the nut when screwed upon the bolt.

A preferred embodiment of the invention is illustrated in the accompanying drawing, forming a part hereof, in which—

Figure 1:
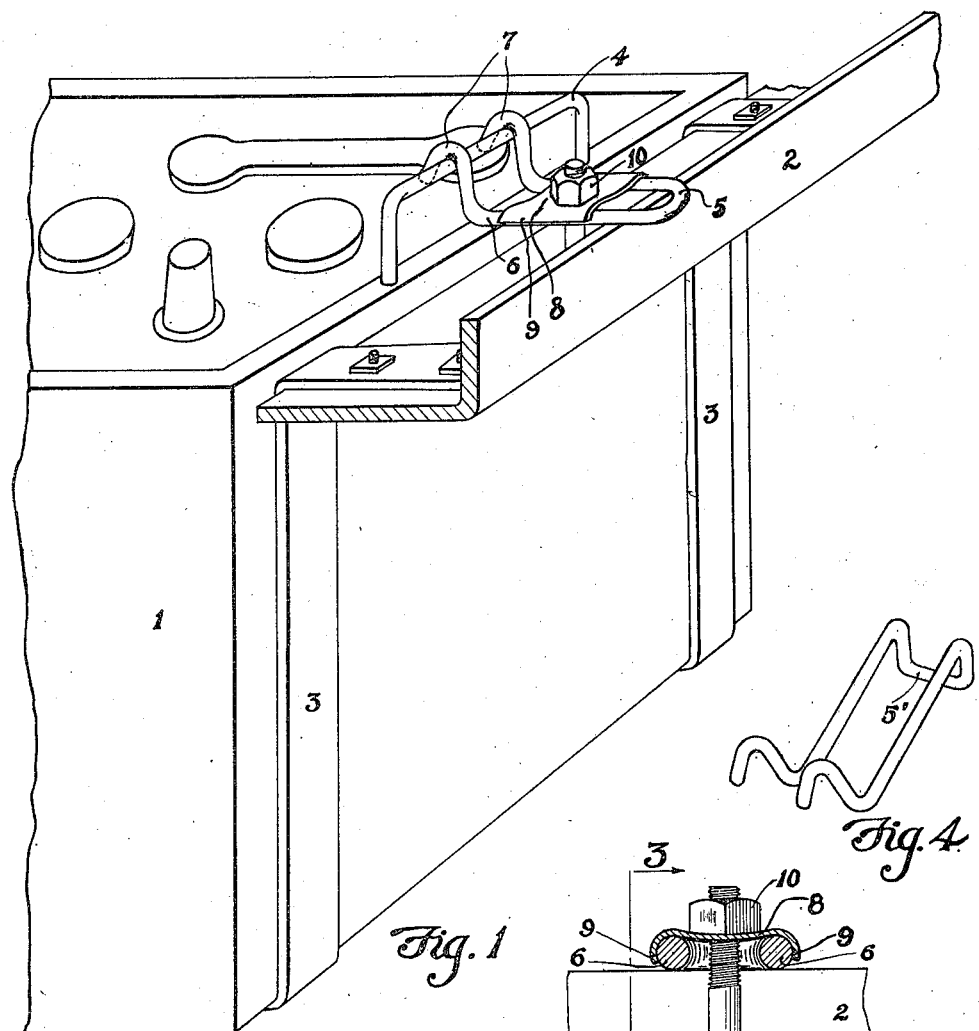
Figure 2:
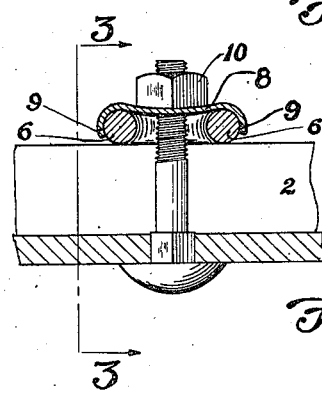
Figure 3:
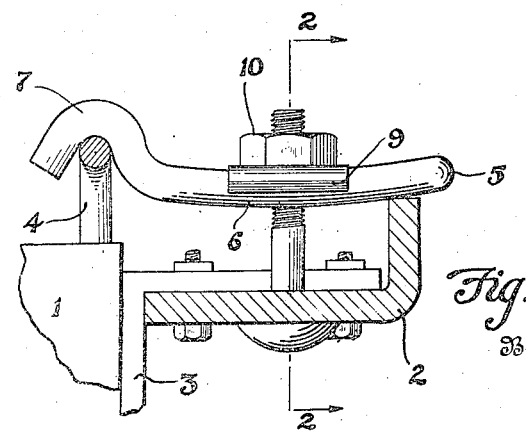

Figure 1 is a fragmentary perspective view of a battery box and supporting frame, showing the improved clamp thereon;

Fig. 2, a side elevation of the clamp, showing the support in section on line 2—2, Fig. 3;

Fig. 3, a cross section of the clamp on line 3—3, Fig. 2; and

Figure 4:
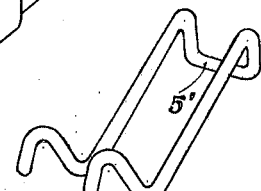

Fig. 4, a detached perspective view of a modified form of the clamp.

Similar numerals refer to similar parts throughout the drawings.

A battery box 1 in an automobile may be mounted in a supporting frame including transverse angle bars 2 adjacent to the end of the box, and straps 3 extending therefrom downward and under the bottom of the box; and the handle 4 of the box extends slightly above the plane of the adjacent upright flange of the angle bar when the box is placed in the supporting frame.

The improved clamp is made of spring wire and is bent U-shape to form a yoke 5 at the outer end, with laterally spaced parallel arms 6 on each side with hooks 7 on the free ends thereof adapted to engage the handle 4 of the box when the yoked end of the clamp bears upon the adjacent flange of the supporting angle bar.

A washer plate 8 made of spring steel is placed across the clamp with its ends 9 curved downward around the side arms thereof, and the parts are secured together by means of a stove bolt extending upward through the horizontal flange of the angle bar 2 and centrally through the washer plate, with its nut 10 bearing on the upper side thereof. The width of the nut is preferably less than the distance between the side arms of the clamp, so as to deflect the washer downward between the arms of the clamp.

By this construction and arrangement, the arms of the clamp span the interval between the handle of the box, which may be referred to as the object, and the upright flange of the angle bar, which may be referred to as the support; and will be deflected downward when the nut is turned upon the bolt, as shown in Fig. 2, thereby holding the object by a yielding clamping action which accommodates itself to such movement or vibration as there may be between the object and the support.

Likewise the washer plate is deflected downward between the side arms of the clamp, which not only supplements the yielding action of the deflected arms, but so concaves the washer plate as to lock the nut in place thereon when it is turned downward on the shank of the bolt, as clearly shown in Fig. 3.

For use with a supporting bar not provided with an upright flange, the modified form of clamp shown in Fig. 3 may be used, in which the yoked end 5' of the clamp is bent downward and flattened so as to bear upon a flat surface, above which the arms of the clamp will be deflected in the same manner as described for the preferred form.

I claim:

1. A clamp for an object and an adjacent support made of spring wire bent to form spaced parallel side arms to span an interval between the object and the support with means on their ends to engage one of them, a spring metal washer plate extending transversely across and engaging the side arms, a bolt extending from the support between the side arms and through the washer plate having a nut bearing upon the washer plate, whereby the arms and the washer plate are deflected when clamped by screwing the nut upon the bolt and the nut is thereby locked upon the washer.

2. A clamp for an object and an adjacent support made of spring wire bent to form spaced parallel side arms to span an interval between the object and the support with means on their ends to engage one of them, a spring metal washer plate extending transversely across and engaging the side arms, a bolt extending from the support between the side arms and through the washer plate having a nut bearing upon the washer plate, whereby the arms are deflected when clamped by screwing the nut upon the bolt.

HARRY J. HICK.